US006306561B1

(12) United States Patent
Gregory

(10) Patent No.: US 6,306,561 B1
(45) Date of Patent: *Oct. 23, 2001

(54) DOUBLE METAL PIXEL ARRAY FOR LIGHT VALVE UTILIZING LATERAL SUBLITHOGRAPHIC SPACER ISOLATION

(75) Inventor: Haydn James Gregory, Palo Alto, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/262,363

(22) Filed: Mar. 4, 1999

(51) Int. Cl.$^7$ ........................................ G03F 7/00
(52) U.S. Cl. ..................... 430/320; 430/20; 430/313
(58) Field of Search ........................... 430/319, 331, 430/320, 20, 321, 313; 349/137, 147

(56) References Cited

U.S. PATENT DOCUMENTS

| | | | |
|---|---|---|---|
| 4,185,894 | 1/1980 | Hilton et al. | 350/338 |
| 4,502,203 | * 3/1985 | Nishizawa et al. | 29/571 |
| 4,999,619 | 3/1991 | Velde | 340/784 |
| 5,352,630 | * 10/1994 | Kim et al. | 437/195 |
| 5,444,005 | * 8/1995 | Kim et al. | 437/52 |
| 5,473,448 | 12/1995 | Yoshinaga et al. | 359/51 |
| 5,705,424 | * 1/1998 | Zavracky et al. | 437/86 |
| 5,706,067 | 1/1998 | Colgan et al. | 349/114 |
| 5,764,324 | 6/1998 | Lu et al. | 349/113 |
| 5,814,529 | * 9/1998 | Zhang | 438/30 |
| 5,838,715 | 11/1998 | Corzine et al. | 372/96 |
| 5,868,951 | * 2/1999 | Schuck, III et al. | 216/24 |
| 5,901,257 | * 5/1999 | Chen et al. | 382/312 |
| 5,945,256 | * 8/1999 | Kim et al. | 430/312 |
| 5,981,354 | * 11/1999 | Spikes et al. | 438/424 |
| 5,982,472 | * 11/1999 | Moore | 349/156 |
| 6,008,876 | * 12/1999 | Moore | 349/139 |

OTHER PUBLICATIONS

Paul M. Moore, "Self–Aligned Pixel With Support Pillars for a Liquid Crystal Light Valve", Co–pending U.S. application No. 09/211,060 filed Dec. 14, 1998.

Paul M. Moore, "Polished Self–Aligned Pixel for a Liquid Crystal Silicon Light Valve", Co–pending U.S. application No. 09/204,825 filed Dec. 3, 1998.

Colgan, E.G., et al., "On–Chip Metallization Layers for Reflective Light Valves", IBM J. Res. Develop. vol. 42 No. 3/4 May/Jul. 1998, pp. 339–345.

Takayama, S., et al., "Effects of Y or Gd Addition on the Structures and Resistivities of Al Thin Films", J. Vac. Sci. Technol. A 14(4), Jul./Aug. 1996, pp. 2499–2504.

(List continued on next page.)

Primary Examiner—Kathleen Duda
(74) Attorney, Agent, or Firm—Stallman & Pollock LLP

(57) ABSTRACT

A pixel cell array of a light valve does not rely upon photolithography to define inter-pixel spacing. Instead, adjacent pixels of the array are electronically insulated from one another by spacers formed by etching a dielectric layer conforming to sidewalls of a patterned first metal layer. Formation of a second metal layer over the dielectric spacer structures, followed by chemical-mechanical polishing of the second metal layer to reveal the tops of the sidewall spacers, completes fabrication of the array. The thickness of the spacer sidewalls, and hence inter-pixel spacing, is determined by the rate of formation of the conforming dielectric layer. This rate can be precisely controlled to produce spacer structures having a thickness less than the minimum linewidth of a given photolithography system. In this manner, pixel arrays having greatly reduced inter-pixel spacing and correspondingly higher cell densities can be created. Arrays with even greater densities and enhanced resolution and clarity can be created where low-k dielectric materials are used to form the dielectric layer and the resulting spacer structures.

9 Claims, 16 Drawing Sheets

OTHER PUBLICATIONS

Takayama, S., et al., "Low Resistivity Al–RE (RE=La, Pr, and Nd) Alloy Thin Films with High Thermal Stability for Thin–Film–Transistor Interconnects", J. Vac. Sci. Technol. B 14(5), Sep./Oct. 1996, pp. 3257–3262.

Underwood, O.I., et al., "Planarisation of Spatial Light Modulator Silicon Back–Planes Using Chemical–Mechanical Polishing", 1994 The Institution of Electrical Engineers, publishes by IEE, Savoy Place, London WC2R OBL. UK, pp. 5/1–5/6.

Castleberry, D. E., et al., "A 1 Mega–Pixel Color a–Si TFT Liquid–Crystal Display", SID 88 Digest, First Ed., May 1987, ISSN 0097–966X, pp. 232–234.

Glueck, J., et al., "Color–TV Projection with Fast–Switching Reflective HAN–Mode Light Valves", SID 92 Digest, ISSN 0097–0966X, pp. 277280.

* cited by examiner

DOUBLE METAL PIXEL ARRAY FOR LIGHT VALVE UTILIZING LATERAL SUBLITHOGRAPHIC SPACER ISOLATION

BACKGROUND OF THE INVENTION

1. Field of the Invention

The present invention relates to light valves, and in particular, to pixel cell arrays for light valves which utilize sublithographic isolation based upon the formation of dielectric spacer structures.

2. Description of the Related Art

Liquid crystal displays (LCDs) are becoming increasingly prevalent in high-density projection display devices. These display devices typically include a light source which passes light through a light valve.

One of the methods for producing colors in a liquid crystal display is to sequentially project light having a wavelength corresponding to a primary color onto a single light valve. Color sequential light valves create a spectrum of color within the range of the human perception by switching between a set of discrete primary colors. Typically, red, green, and blue are the primary tri-stimulus colors used to create the remaining colors of the spectrum.

Specifically, during projection of each primary color, the light intensity is modulated such that combination of the intensities of the primary colors in sequence produces the desired color. The frequency of switching between the primary wavelengths by the light valve should be sufficiently rapid to render discrete primary states indistinguishable to the human eye.

Two factors dictate the minimum frequency necessary for switching. The first factor is the ability of the human eye to detect the discrete primary colors (e.g., red, green, blue). At slower than ideal switching speeds, the human eye will detect a flicker and the primaries may not blend.

The second factor determining the frequency of switching is the video refresh rate. During display of video images, the individual frames must be refreshed at frequencies undetectable to the human eye.

The net frequency of switching demanded by the combination of sequential color blending and video refreshing is beyond the capabilities of light valves that utilize thick (>1 $\mu$m) liquid crystal (LC) transducers. However, thin (<1 $\mu$m) liquid crystal transducers have been successfully fabricated. These thin LC transducers demonstrate adequate color sequential blending at video refresh rates. One example of such a thin LC transducer pixel cell structure is disclosed in U.S. Pat. No. 5,706,067, to Colgan et al.

In general, the conventional thin LC transducer pixel cells possess enhanced responsiveness due to the decreased volume of liquid crystal material between the top and bottom plates. A smaller volume enables the liquid crystal to shift orientation more quickly and in response to a lower applied voltage.

FIG. 1 shows a cross-sectional view of adjacent thin LC transducer pixel cells in a conventional light valve. Light valve portion 100 comprises adjacent pixel cells 110a and 110b having liquid crystal (LC) material 111 sandwiched in gap 106 between a top plate and a bottom plate. Top plate 102 is composed of a translucent material, typically glass. The bottom plate is formed by the reflective metal pixel electrodes 112a and 112b of adjacent pixels 110a and 110b, respectively.

Pixel electrodes 112a and 112b are separated and electrically isolated by trench 118. Pixel electrodes 112a and 112b lie on top of an upper intermetal dielectric layer 128 that is one component of interconnect scheme 104. Interconnect 104 overlies capacitor structures 118a and 118b formed within underlying silicon substrate 105. Underlying capacitors 118a and 118b are in electrical communication with pixel electrodes 112a and 112b, respectively, through metal-filled vias 140 and middle interconnect metallization layer 124 and lower interconnect metallization layer 122.

FIGS. 2AA–2DB illustrate the steps of the conventional process for forming an array of pixel cells in a light valve. For purposes of convention, all FIGS. 2_A illustrate a top view of the pixel cell, all FIGS. 2_B illustrate a cross-sectional view of the pixel cell along line A–A' of the FIG. 2_A.

FIGS. 2AA–2AB illustrate the starting point for the conventional process for fabricating a thin LC transducer pixel cell. Starting structure 200 is created by forming an upper intermetal dielectric layer 212 over a lower interconnect metallization layer 214. A central portion of upper intermetal dielectric layer 212 is then etched to form via 216. A liner (not shown) typically composed of a Ti/TiN layer combination, is then formed on the walls of via 216, and via 216 is filled with metal (typically CVD Tungsten). Excess metal is then removed from the surface of upper dielectric layer 212, typically by a combination of etching and chemical-mechanical polishing (CMP).

FIGS. 2BA–2BB illustrate formation of the metal pixel electrode in accordance with the conventional process. Metal pixel electrode layer 206 is formed over the entire surface of the pixel cell.

FIGS. 2CA–2CB illustrate patterning of a photoresist mask 207 over pixel electrode layer 206. FIGS. 2DA–2DB show the etching of regions of pixel electrode layer 206 unmasked by photoresist 207, to form a plurality of intersecting trenches 218, followed by stripping of photoresist mask 207. Intersecting trenches 218 in turn define a plurality of discrete pixel cell electrodes 230.

Fabrication of the thin LC transducer pixel cell is completed by forming an alignment surface (not shown) for the LC material positioned on top of the pixel electrode. Forming this alignment surface is a two step process. First, a dielectric film (typically polyimide) is deposited on top of the pixel electrode. Second, the dielectric film is scored by a rubbing wheel, which traverses the surface of the pixel cell and gouges the alignment surface in a uniform direction. Liquid crystal material is then placed within the cell, and a top glass plate is secured to the tops of the support pillars.

The conventional fabrication process described above in FIGS. 2AA–2DB is adequate to produce functional thin LC transducer pixel cells. However, the conventional process flow suffers from a number of disadvantages.

One problem is that the step of defining and etching the inter-pixel trenches requires an additional masking step. This masking step carries with it penalties in terms of additional defects and higher cost.

Another problem is that minimum spacing between adjacent pixels is dictated by the limits of resolution of the photolithographic process employed. This limitation is manifested in the step of patterning the mask to form the trenches in the pixel electrode layer, as shown above in FIGS. 2CA–2CB. For example, in a 0.3 $\mu$m linewidth photolithographic technology, the distance across trench 218 of FIGS. 2DA–DB could be no less than 0.3 $\mu$m.

The closer together the pixels of the array, the better the array will perform. This is particularly true with respect to minimizing leakage of incident light between pixel electrodes through the interconnect and into the underlying substrate, as there is less inter-pixel spacing to allow the passage of incident light. Close proximity between pixels also reduces unwanted optical artifacts attributable to interruption in the continuous pixel array backplane by topography associated with inter-pixel isolation structures.

Therefore, there is a need in the art for a process of forming an array of pixel cells where inter-pixel spacing is not constrained by photolithographic parameters, thereby enabling formation of arrays having greater pixel cell densities and enhanced resolution and clarity.

SUMMARY OF THE INVENTION

The present invention provides a process flow for forming an array of pixel cells that does not rely upon photolithography to define inter-pixel isolation. Instead, adjacent pixels of the array are electrically insulated from one another by dielectric spacer structures formed by the deposition and etching of a dielectric layer conforming to raised features of a first metal layer. The thickness of the sidewall spacers is determined by the conditions under which the dielectric material forming the spacers is deposited. The deposition rate of dielectric material can be carefully controlled to reliably produce spacers having a thickness of less than the minimum linewidth of a given photolithography system. In this manner, inter-pixel isolation in accordance with the present invention can result in fabrication of pixel arrays having much greater cell densities than found in conventional arrays.

A process flow for forming a pixel cell array in accordance with one embodiment of the present invention calls comprises the steps of forming a first metal layer on top of an upper intermetal dielectric layer, forming a first dielectric layer over the first metal layer, and forming a photoresist mask over the first metal layer in a checkerboard pattern which includes a plurality of masked squares but which excludes corners of the masked squares. Unmasked portions of the first dielectric layer and the first metal layer are then etched to stop on the upper intermetal dielectric layer, leaving a raised portion of the first metal layer having a top and sidewalls. The photoresist mask is removed, and a second dielectric layer is formed over the upper intermetal dielectric layer and the top of the first metal layer, the second dielectric layer conforming to the sidewalls. The second dielectric layer is etched to remove the second dielectric layer over the upper intermetal dielectric layer while leaving vertical dielectric spacer structures along the sidewalls. A second metal layer is formed over the upper intermetal dielectric layer, the first dielectric layer, and the dielectric spacer structures. The second metal layer and the second dielectric layer are then chemical-mechanical polished to form a substantially planar metal electrode surface including intervening dielectric structures.

A pixel array in accordance with one embodiment of the present invention comprises an array of pixel cells arranged in a checkerboard pattern having a first set of squares alternating with a second set of squares, the first set of squares formed from a first metal layer and lacking corners, and the second set of squares formed from a second metal layer. The pixel array also includes dielectric spacer structures intervening between the first set of squares and the second set of squares, the dielectric spacer structures formed by deposition of dielectric material over the first metal layer.

The features and advantages of the present invention will be understood upon consideration of the following detailed description of the invention and the accompanying drawings.

DETAILED DESCRIPTION

The increasing reliance upon digital integrated circuit technology has heightened the importance of ensuring that process flows leading to formation of pixel arrays are compatible with those leading to formation of CMOS devices. One characteristic feature of CMOS process flows is formation of dielectric spacer structures on either side of the polysilicon gate.

Figure 1:
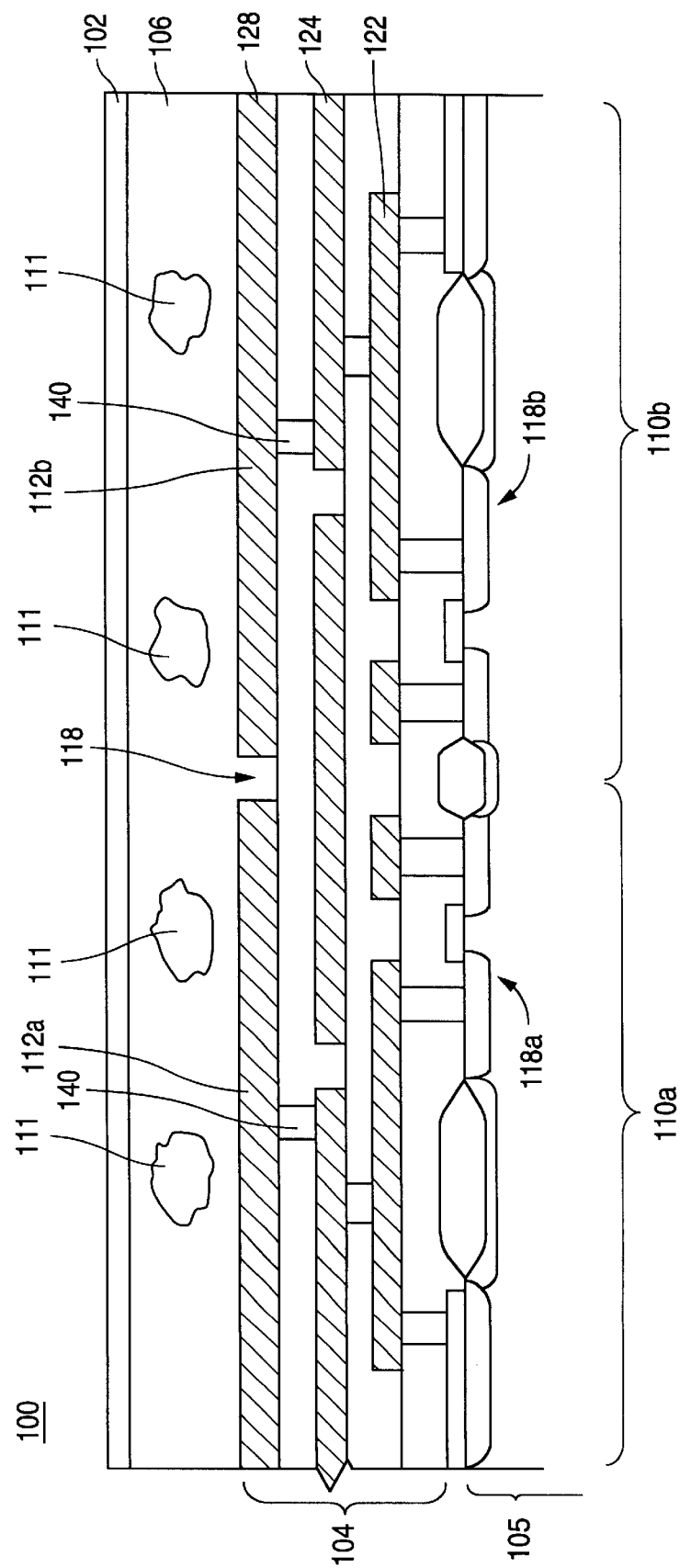
FIG. 1 shows a cross-sectional view of adjacent pixel cells in a conventional light valve.
Figure 2A:
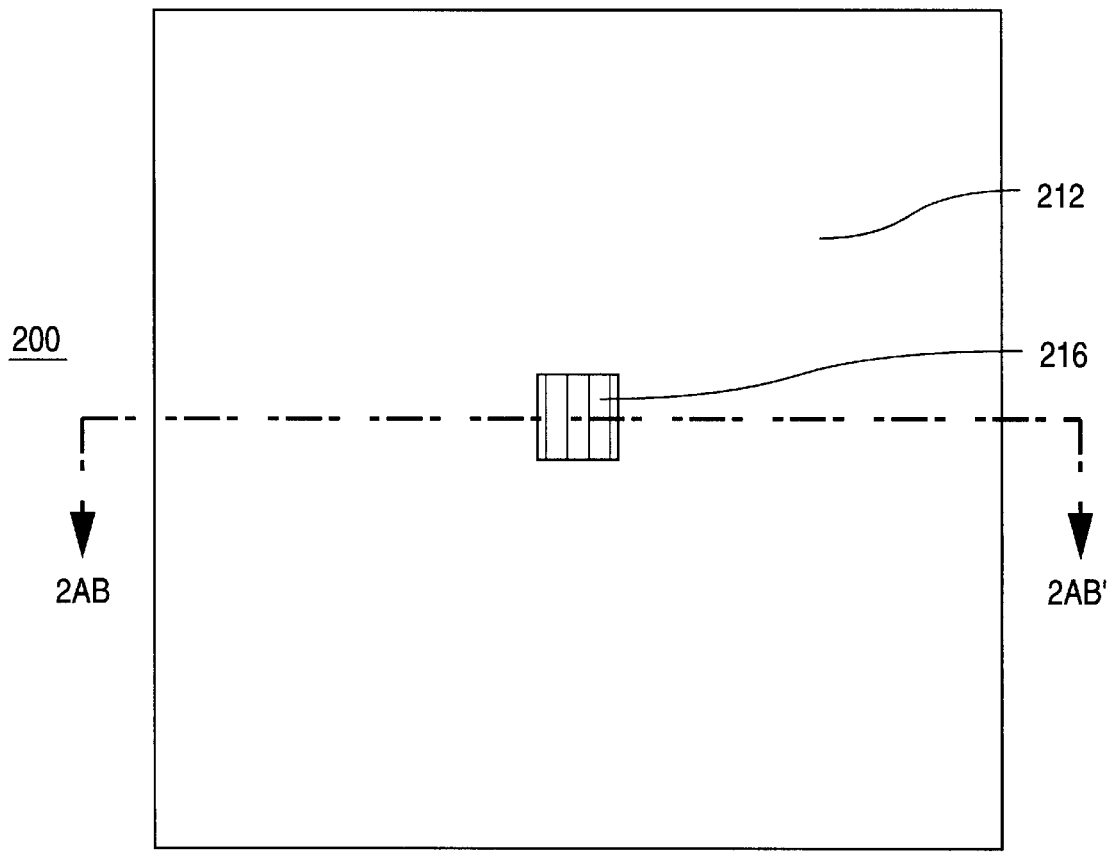
FIGS. 2AA–2DB show top and cross-sectional views of the conventional process steps for forming an array of pixel cells.
Figure 2A:
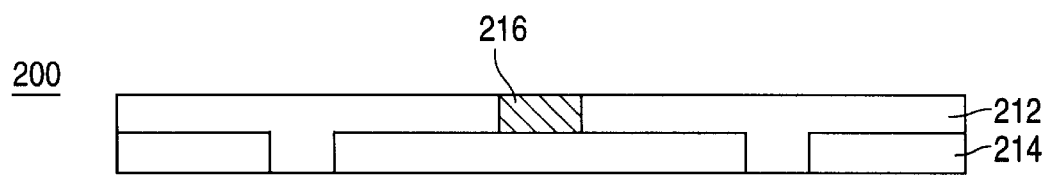
Figure 2B:
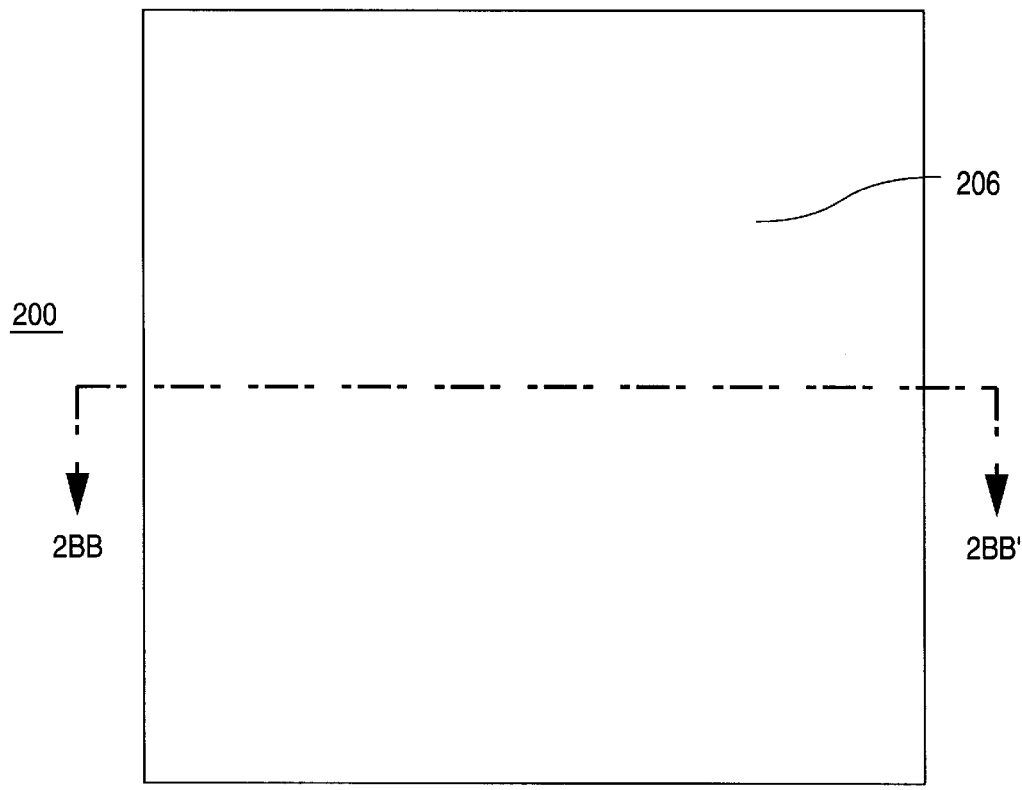
Figure 2B:
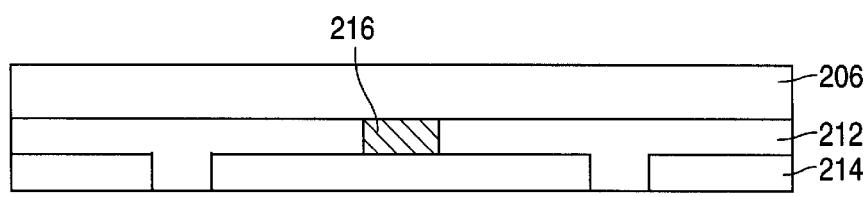
Figure 2C:
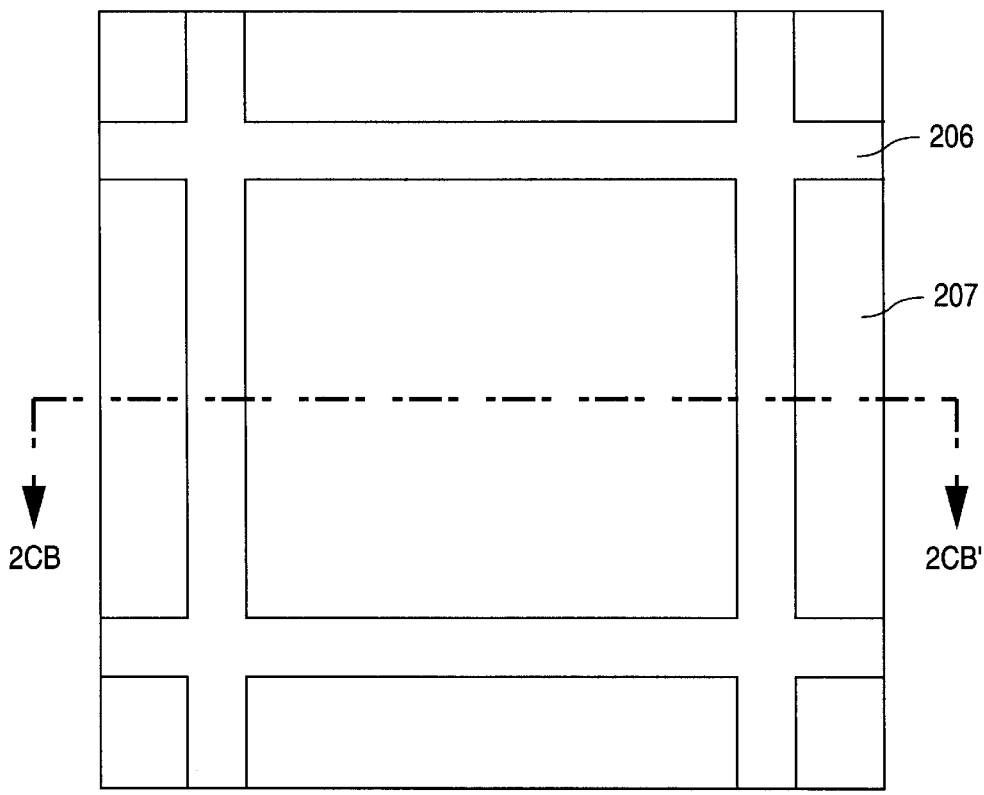
Figure 2C:
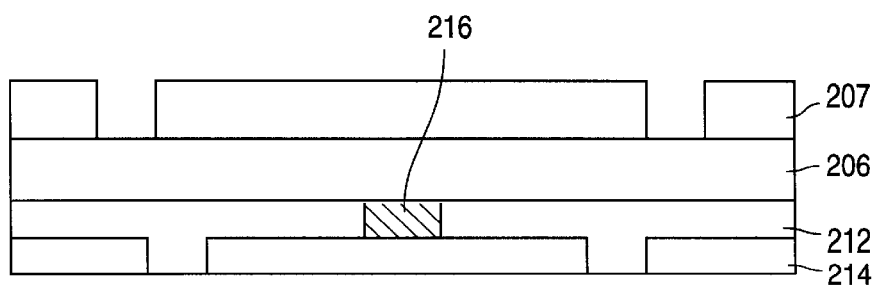
Figure 2D:
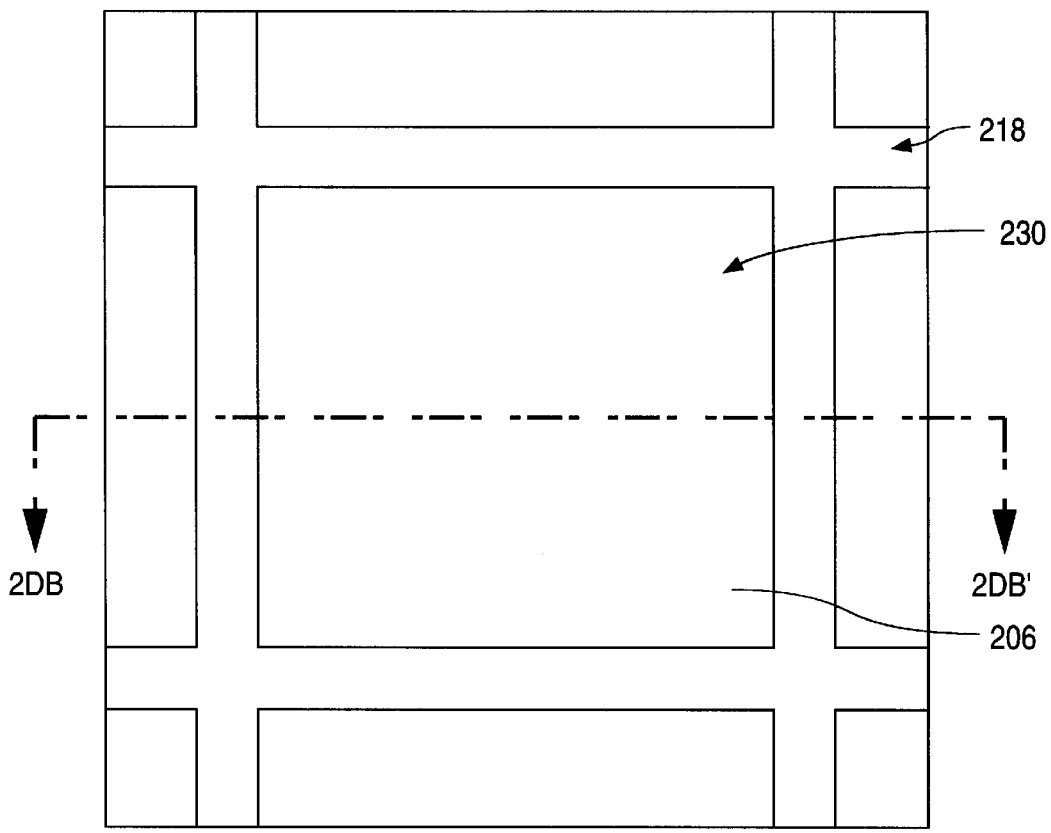
Figure 2D:
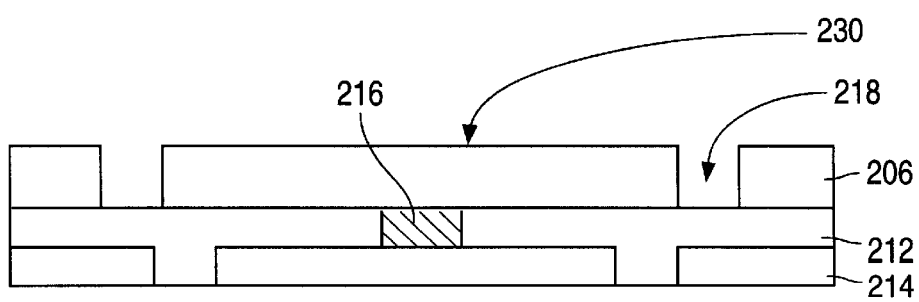
Figure 3:
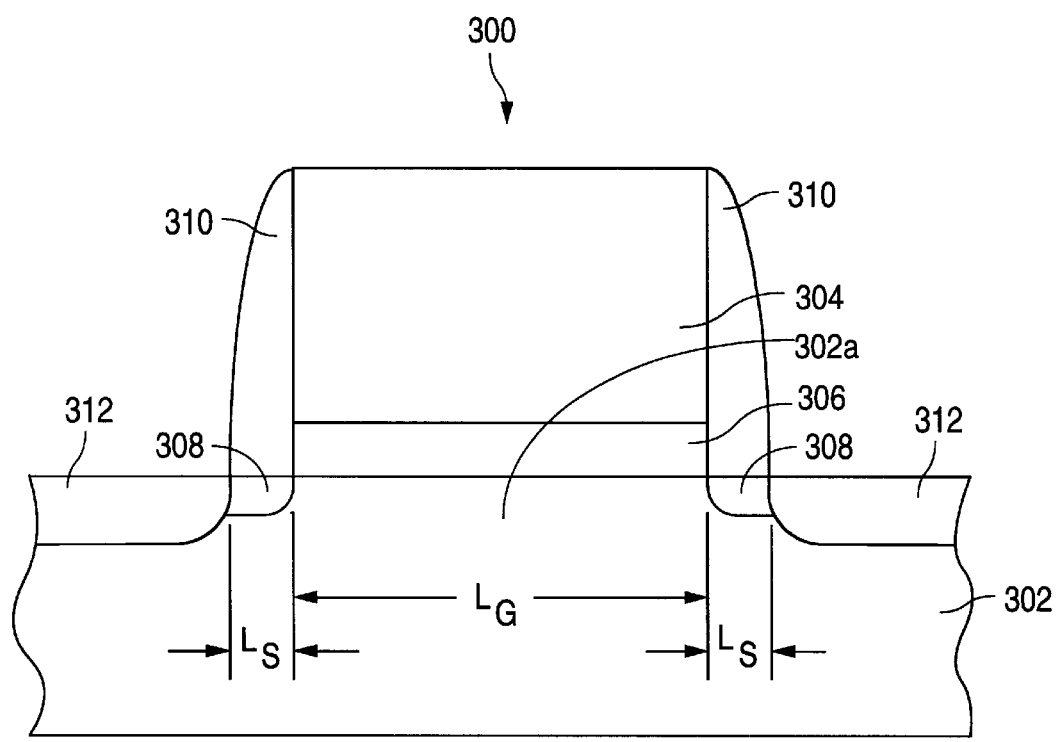
FIG. 3 shows a cross-sectional view of an exemplary CMOS gate structure.

FIG. 3 shows a cross-sectional view of an exemplary CMOS gate structure. First, gate 300 is formed over single crystal silicon 302 to define a channel region 302a. Gate 300 consists of polysilicon layer 304 overlying gate oxide layer 306.

Lightly-doped drain (LDD) regions 308 are then implanted into single crystal silicon 302, aligned to the edge of gate 300. Dielectric spacer structures 310 are then formed adjacent to gate 300. Spacer structures 310 are created by forming a dielectric layer that conforms to vertical sidewalls 300a of gate 300, and then carefully etching the dielectric layer to leave only spacer structures 310.

Finally, source/drain regions 312 are implanted into single crystal silicon 312, aligned to spacer structures 310. Source/drain regions 312 are linked to channel 302a by LDD regions 308.

The length of the gate ($L_G$) is the defining feature of a CMOS device. In general, the minimum linewidth capability of a given photolithography system thus generally defines $L_G$. In many photoresist systems, the thickness of the spacers ($L_S$) is typically substantially less than the gate length.

Therefore, the present invention utilizes dielectric spacer structures to accomplish sublithographic electrical isolation of adjacent electrodes of a pixel array. In this process, a first metal layer is deposited over an upper intermetal dielectric and then etched to form a checkerboard pattern. A dielectric layer conforming to the underlying surface is deposited and then carefully etched to leave only spacer structures along the sidewalls of raised portions of the first metal layer.

A second metal layer is then formed over the entire surface. The second metal layer is subjected to chemical-mechanical polishing such that exposed tops of the dielectric spacer structures serve to separate and electrically isolate electrodes of adjacent pixel cells.

Figure 4A:
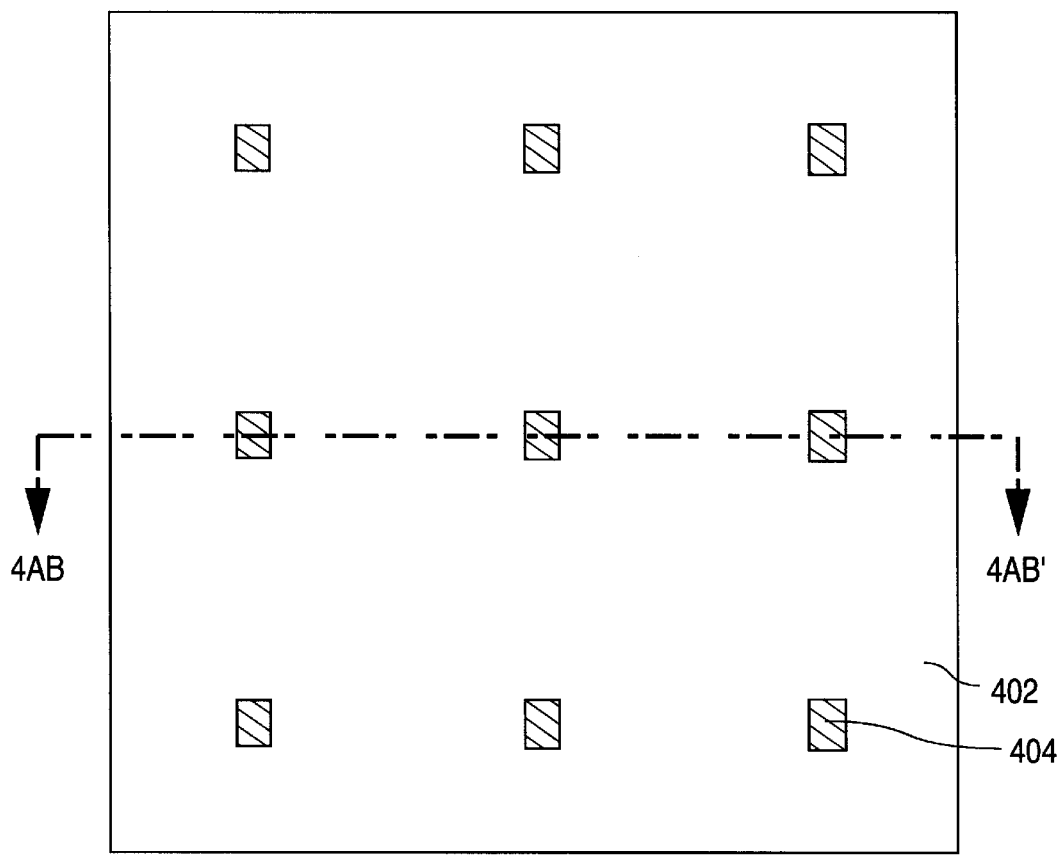
FIGS. 4AA–4HB show top and cross-sectional views of the process steps for forming an array of pixel cells in accordance with a first embodiment of the present invention.
Figure 4A:
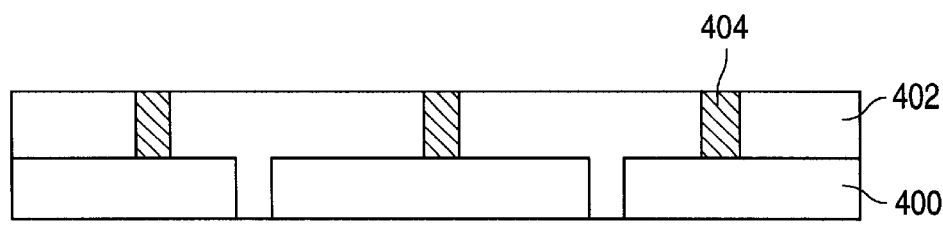

FIGS. 4AA–4HB illustrate the process steps for forming an array of pixel cells in a light valve in accordance with a first embodiment of the present invention. For purposes of convention, all FIGS. 4A illustrate a top view of the pixel cell array, and all FIGS. 4B illustrate a cross-sectional view of the pixel cell array along line A–A' of the FIG. 4A.

FIGS. 4AA–4AB illustrate the starting point for the process. Upper intermetal dielectric layer 402 is formed over upper interconnect metallization layer 400. Vias 404 are etched through upper intermetal dielectric layer 402 to stop on upper interconnect metallization layer 400. Vias 404 are filled with metal, and excess metal is removed.

Figure 4B:
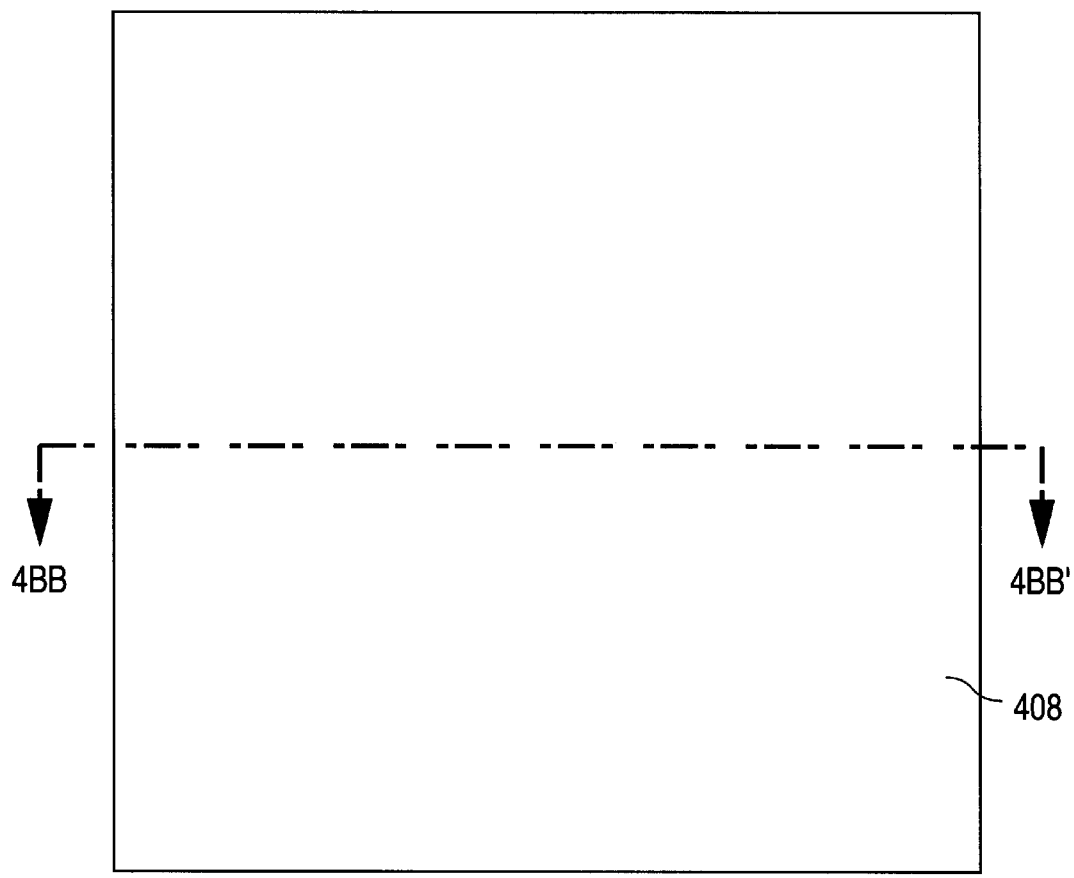
Figure 4B:
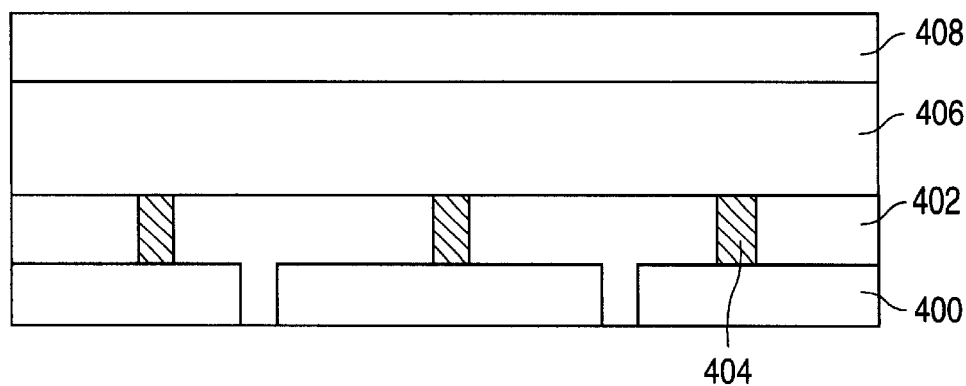
Figure 4C:
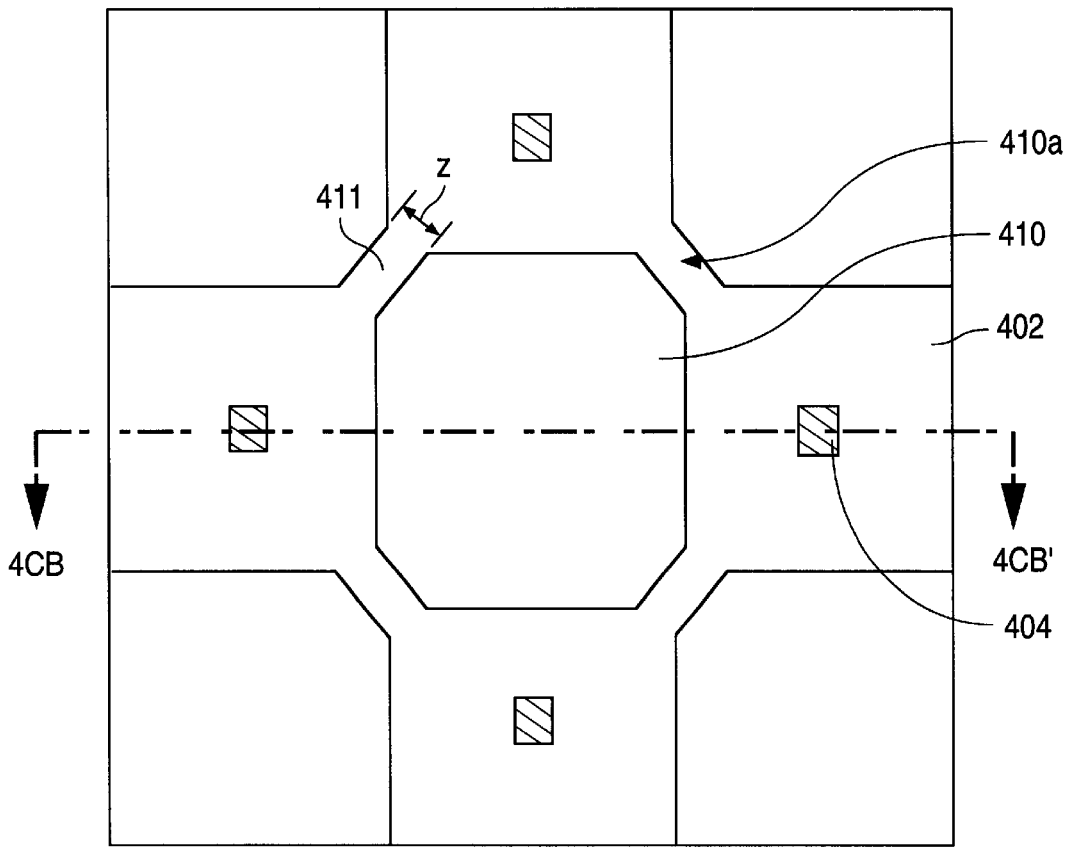
Figure 4C:
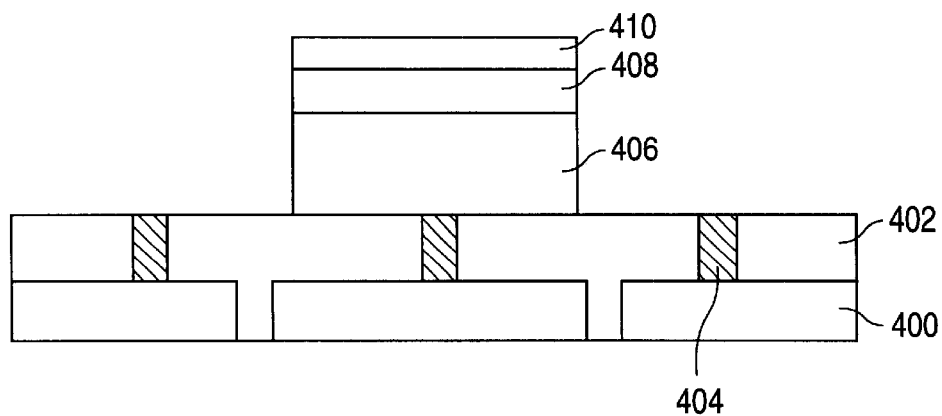

FIGS. 4BA–4BB show the next step, wherein first metal layer 406 is formed over the entire surface, and first dielectric layer 408 is formed over first metal layer 406. FIGS. 4CA–4CB show patterning of a photoresist layer, followed by development to form first metal mask 410. First dielectric layer 408 and first metal layer 406 are then etched in unmasked regions.

In FIG. 4CA, first metal mask 410 is shown in the form of a slightly modified checkerboard, with corners 410a excluded. As described in detail below, exclusion of corners 410a from first metal mask 410 creates gap 411 having a width Z between the tips of diagonally situated electrodes, thereby ensuring adequate inter-pixel isolation.

Figure 4D:
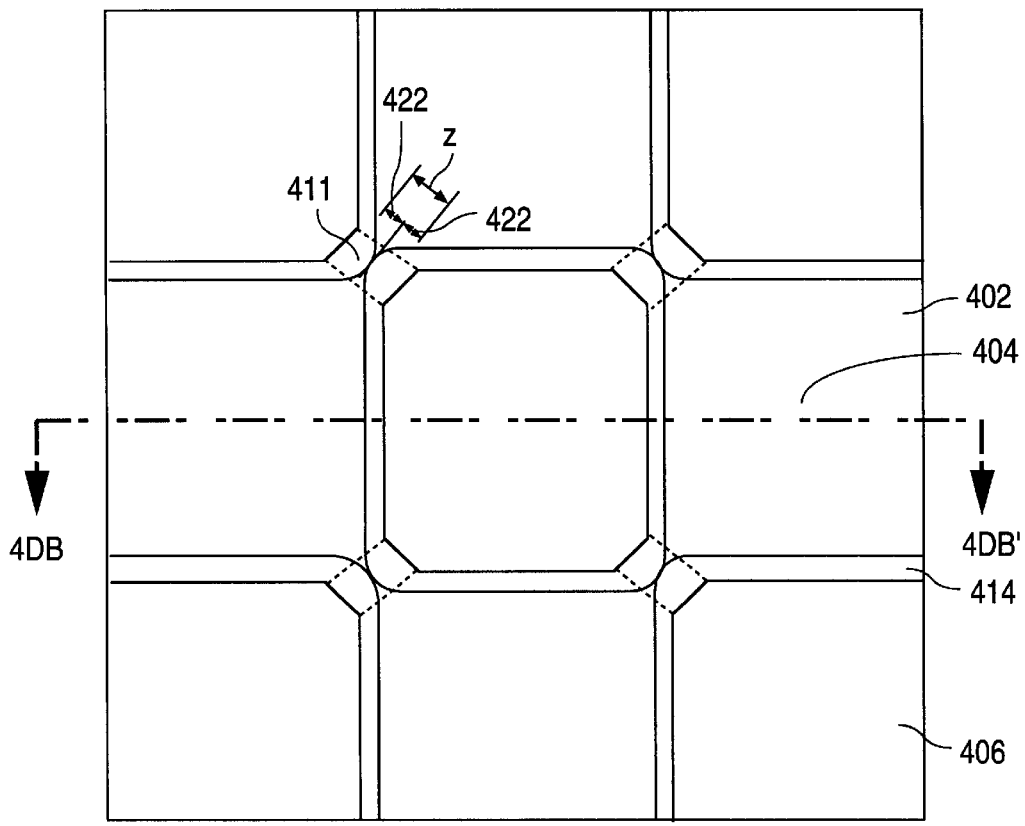
Figure 4D:
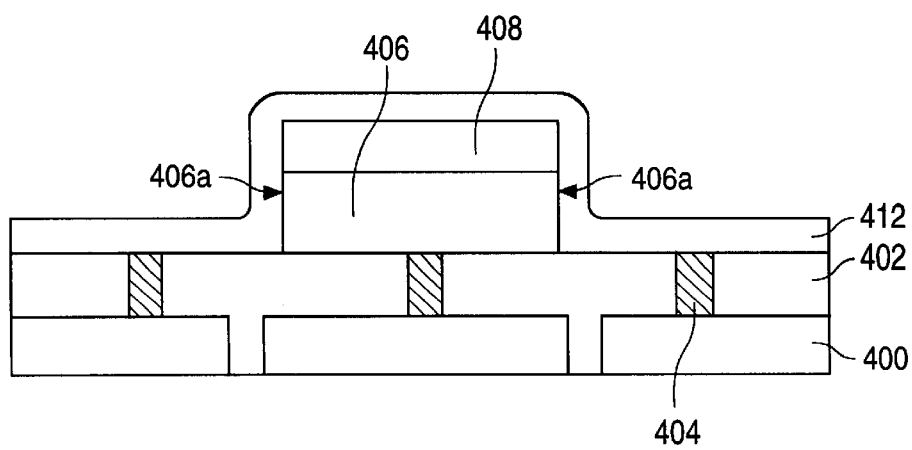

FIGS. 4DA–4DB show stripping of first metal mask 410, followed by formation of second dielectric layer 412 over the entire surface, including raised portions of first metal layer 406. Second dielectric layer 412 conforms closely to the underlying metal topography, becoming vertical along raised sidewalls 406a of first metal layer 406. Careful control over the rate of chemical vapor deposition of dielectric material during this step can result in the formation of spacer walls substantially narrower than the minimum linewidth of a given photolithography system.

In order to ensure proper electrical isolation between diagonally-situated pixel electrodes, the combined thickness of the dielectric material formed on opposing sides of gap 411 must be greater than the width Z of gap 411. Assuming an equal rate of deposition on both sides of gap 411, the thickness of dielectric layer 411 must therefore be at least ½Z, and preferably larger.

Figure 4E:
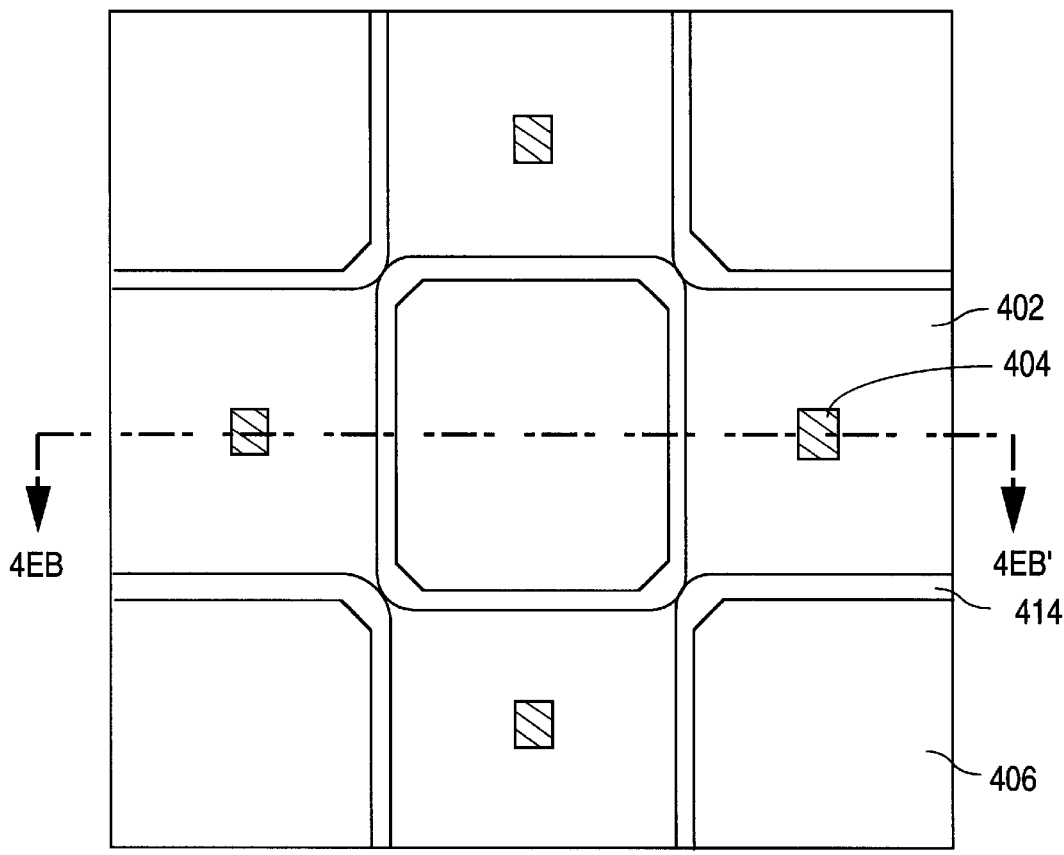
Figure 4E:
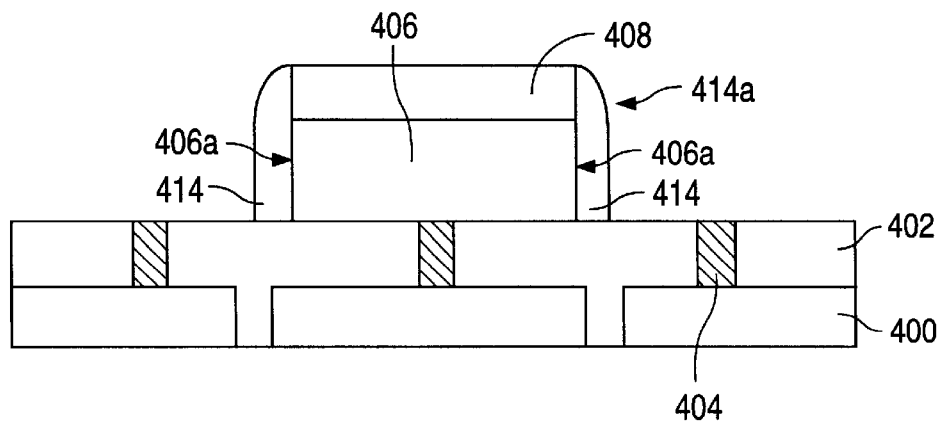

FIGS. 4EA–4EB show anisotropic etching of second dielectric layer 412. This etching is carefully controlled, so that second dielectric layer 412 is completely removed over the surface of upper intermetal dielectric 402 and vias 404, but remains along sidewalls 406a of raised portions of first metal layer 406 as dielectric spacer structures 414. Dielectric spacer structures 414 have a curved upper portion 414a reflecting the shape of second dielectric layer 412 as originally deposited.

Figure 4F:
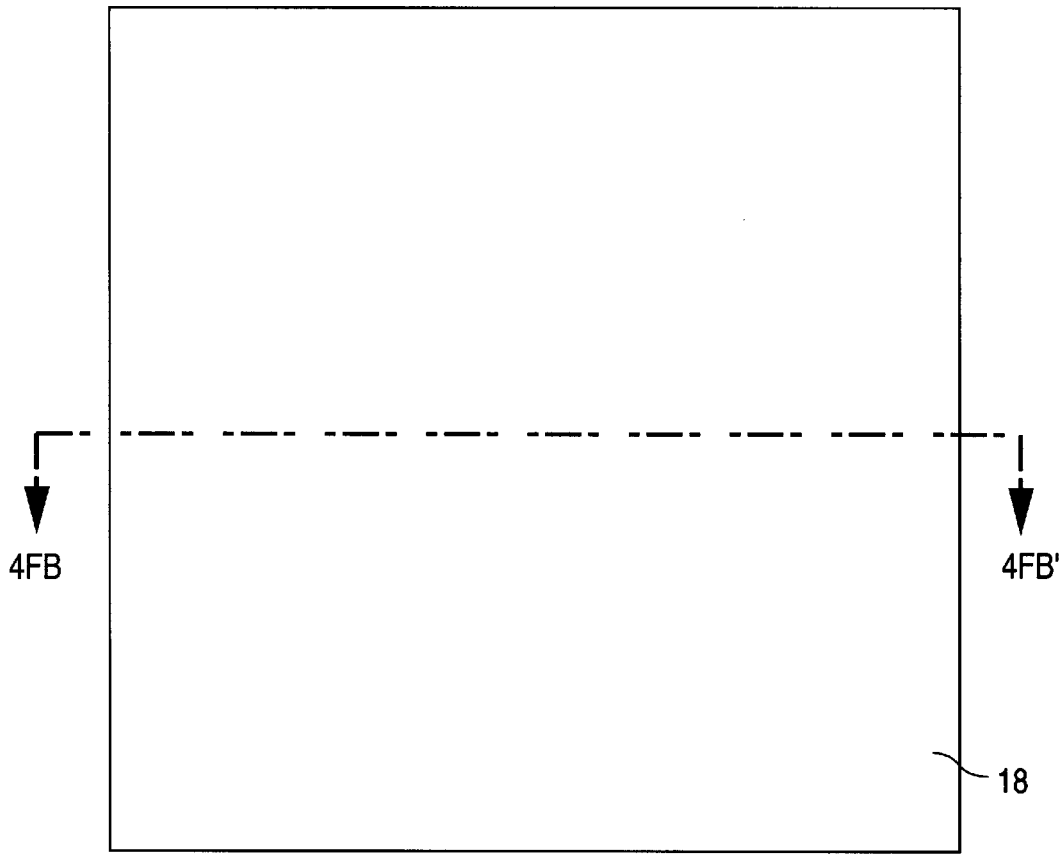
Figure 4F:
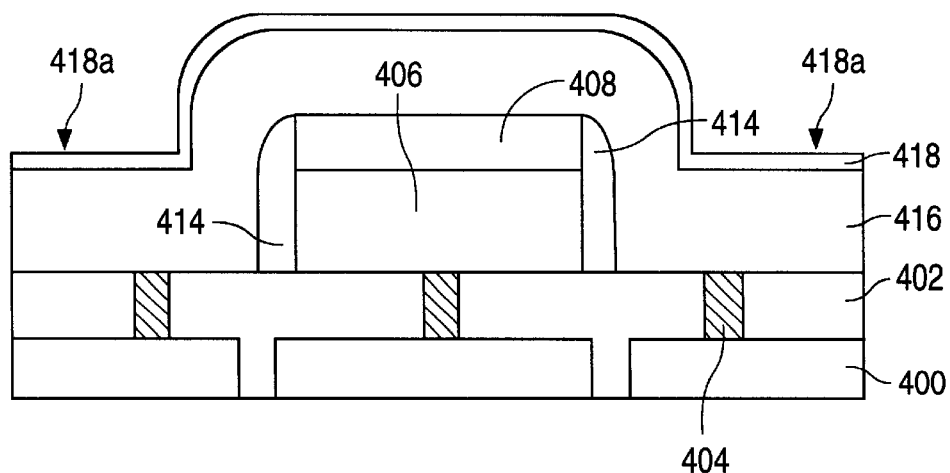

FIGS. 4FA–4FB show the next step in the process flow, wherein second metal layer 416 is formed over the entire surface, and third dielectric layer 418 is formed over second metal layer 416. The thickness of second metal layer 416 is carefully controlled to match the thickness of first metal layer 406.

Figure 4G:
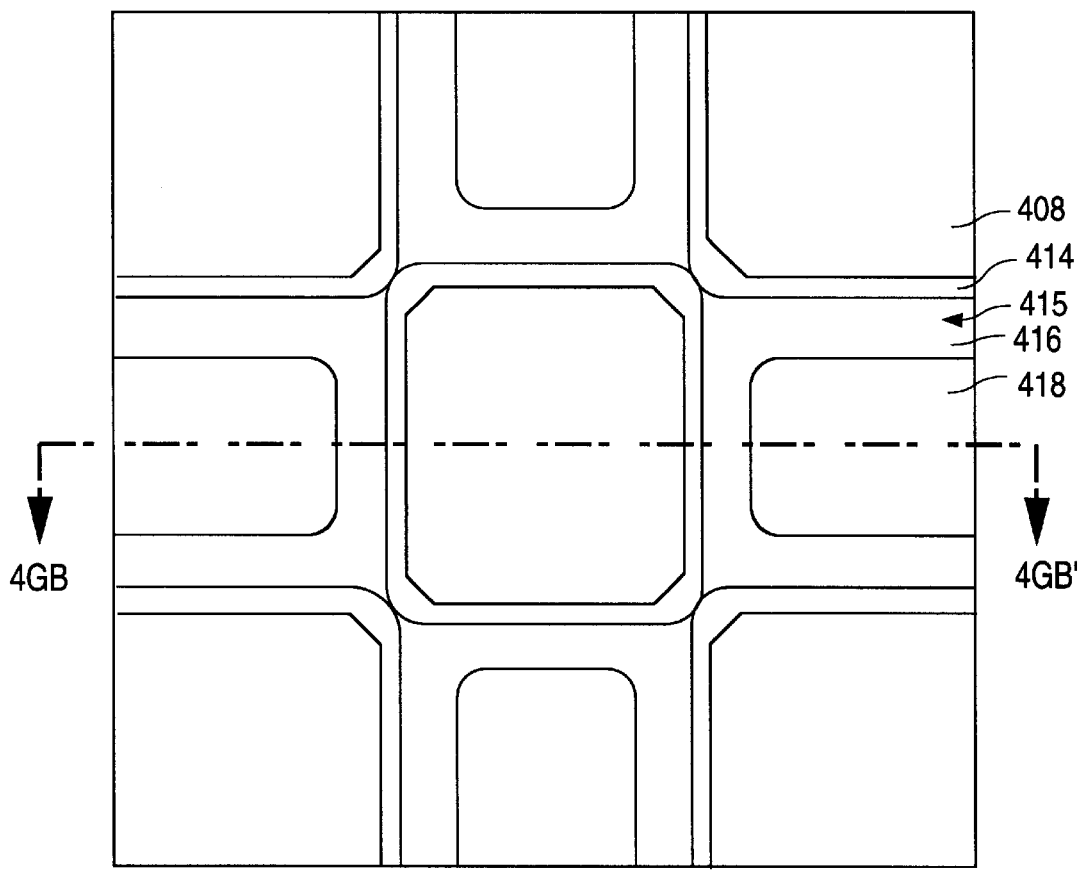
Figure 4G:
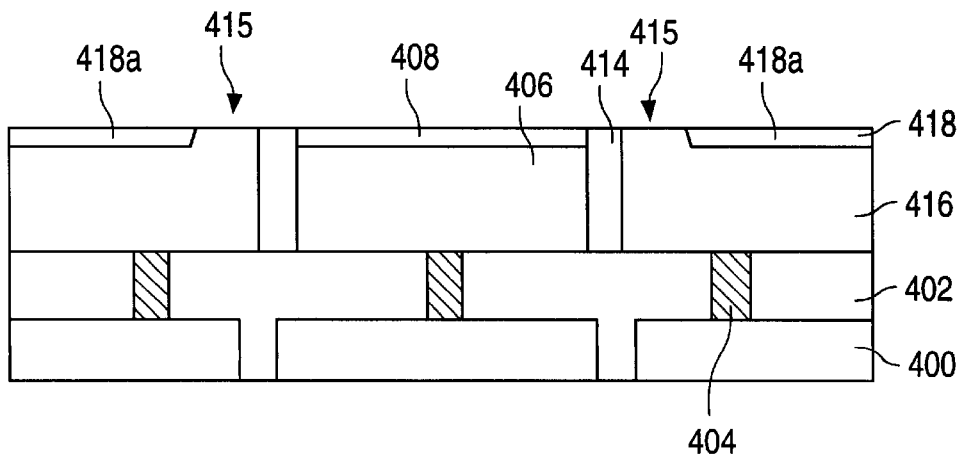

FIGS. 4GA–4GB show chemical-mechanical polishing of the entire surface to stop upon lower portions 418a of third dielectric layer 418. This chemical-mechanical polishing removes the curved upper portion of dielectric spacer structures 414, leaving the adjacent pixel electrodes 415 electronically isolated by intervening rectangular spacers 414.

Figure 4H:
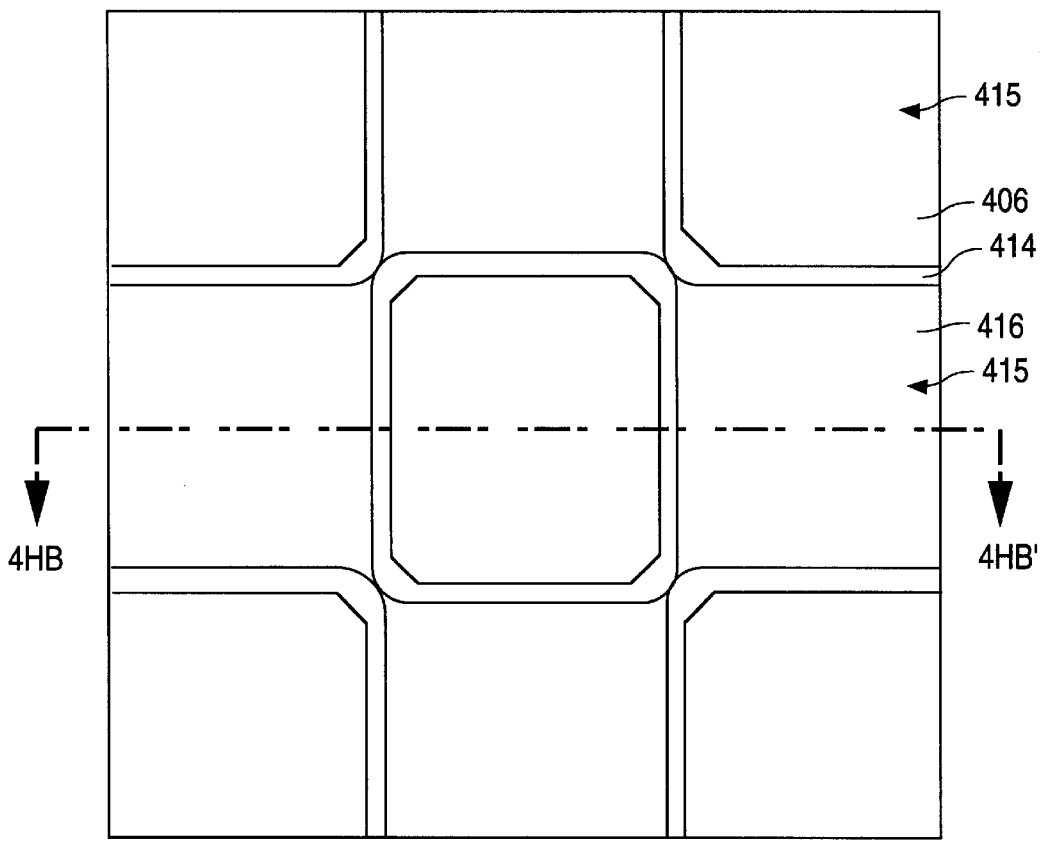
Figure 4H:
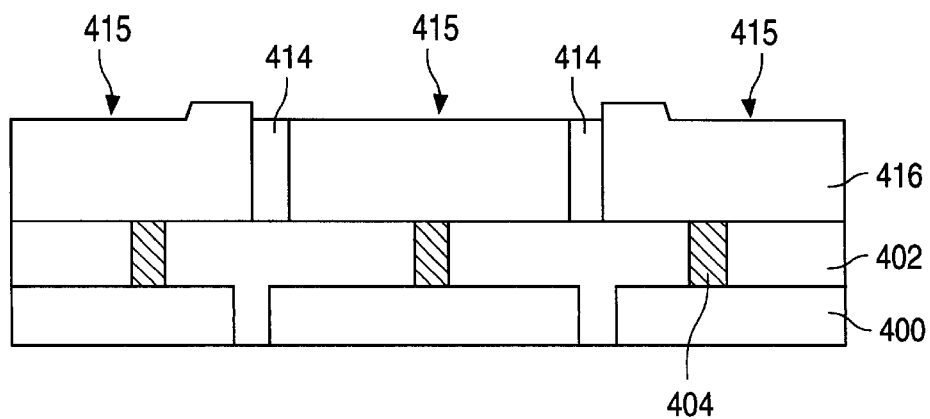

FIGS. 4HA–4HB show completion of fabrication of pixel cells of the array, by etching remaining portions of the first and the third dielectric layers to completely reveal the reflective surface of pixel electrodes 415.

FIG. 4HB depicts some surface topology in pixels formed from the second metal layer. This topology results where the second metal layer originally conformed to raised portions of the first metal layer. However, the relative size of this topology is exaggerated in FIG. 4GB, because the width of the pixel would actually be much greater than the thickness of the remaining dielectric layer.

Fabrication of the liquid crystal silicon light valve is completed by adding liquid crystal material, and then sealing a translucent top plate over the structure.

The thin LC transducer pixel cell and the process for forming this pixel cell in accordance with the present invention offers a number of important advantages. One advantage is that an array is formed having a high density of pixel cells. Because inter-pixel spacing can be reduced below limits imposed by photolithographic constraints, the present invention permits pixel electrodes to readily be positioned closer together than previously possible given a particular photolithography system. Closer spacing of pixels in turn permits finer resolution of images, and minimizes distortion caused by interruption in the otherwise continuous reflective backplane of the light valve attributable to inter-pixel topography. Closer pixel spacing also helps prevent unwanted leakage of light in the space between pixels.

Although the invention has been described in connection with one specific preferred embodiment, it must be understood that the invention as claimed should not be unduly limited to such specific embodiments. Various other modifications and alterations in the structure and process will be apparent to those skilled in the art without departing from the scope of the present invention.

For example, as shown in FIG. 4CA, the photoresist layer forming the first metal mask may be specifically patterned to exclude corners of the square portions, thereby providing space for dielectric material between diagonally-situated pixels. However, there are several possible alternatives to this step.

Figure 5:
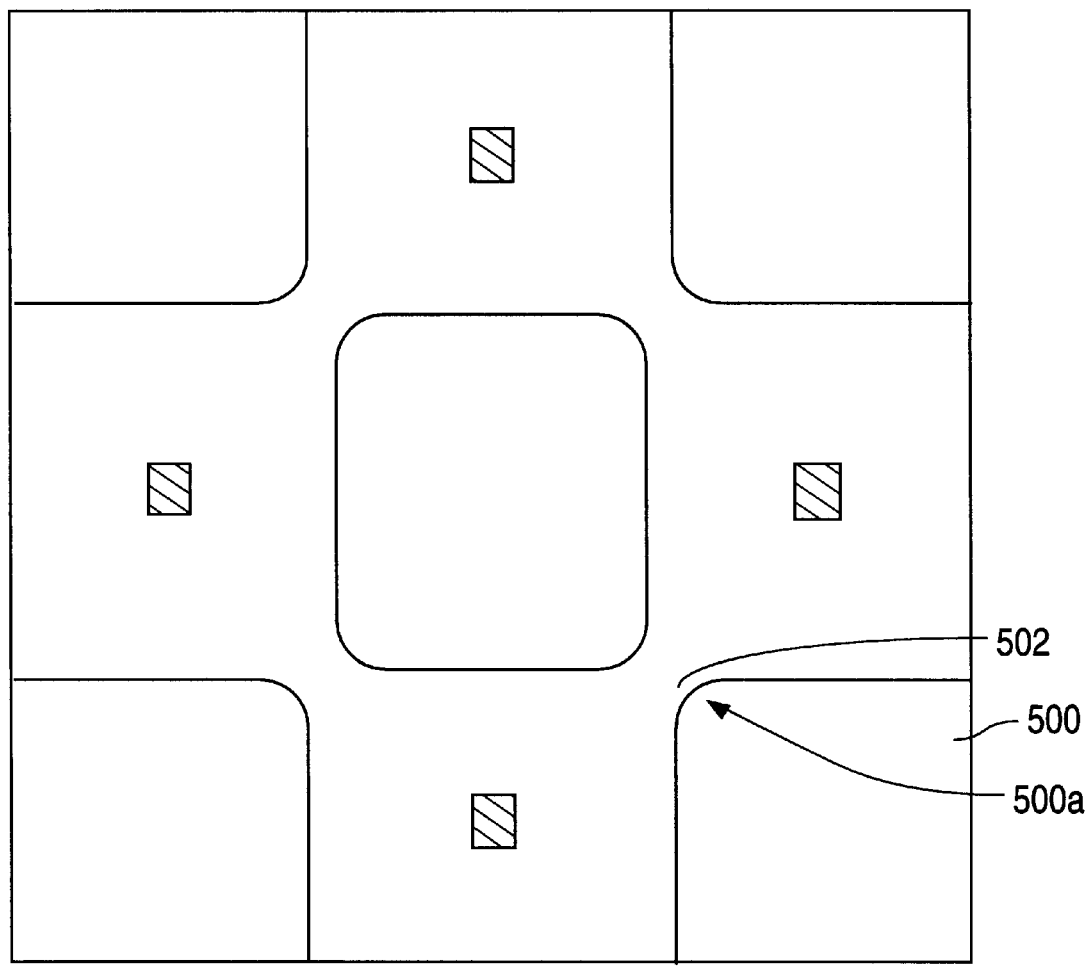
FIG. 5 shows a plan view of a first metal mask as employed in accordance with a first alternative embodiment of the present invention.

FIG. 5 shows a plan view of a photoresist mask in accordance with a first alternative embodiment of the present invention. In FIG. 5, first metal mask 500 is formed by patterning a photoresist layer in a precise checkerboard pattern, followed by carefully over-exposing the photoresist layer during development. As a result of this calculated over-exposure, corners 500a of first metal mask 500 are rounded and exclude corner portions 502.

Figure 6:
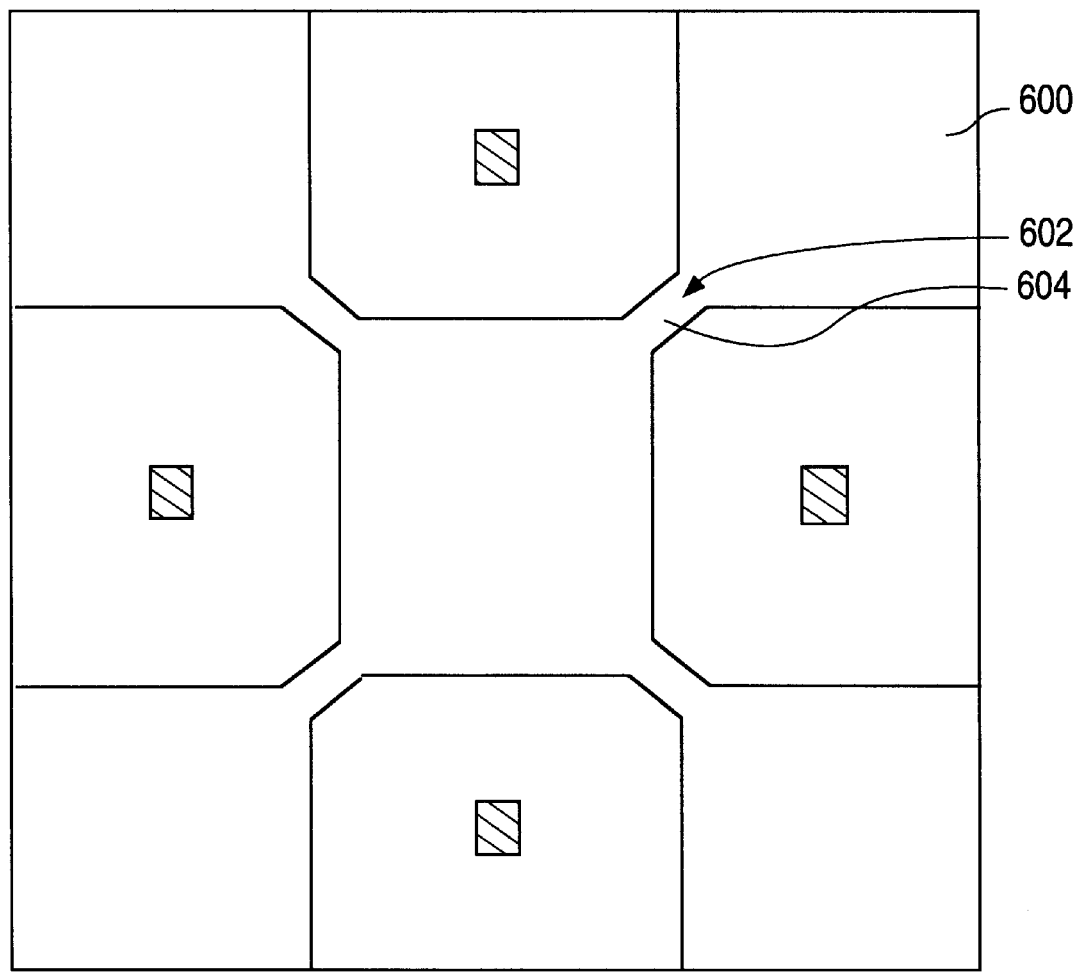
FIG. 6 shows a plan view of a first metal mask as employed in accordance with a second alternative embodiment of the present invention.

FIG. 6 shows a plan view of a photoresist mask in accordance with a second alternative embodiment of the present invention. The exposure kinetics of a particular photolithography system may require surplus photoresist material in corner regions in order to ensure that gaps are formed between diagonally-situated electrodes. Photoresist layer 600 therefore includes corner portions 602 linked together by tabs 604. Development of the patterned photoresist layer 604 may ultimately eliminate tabs 604 altogether, creating the necessary gaps to form between corners of diagonally-situated pixels.

Composition of the various layers making up the array may be varied to achieve optimum device performance and/or process efficiency. For example, FIGS. 4AA–4HB depict successive formation of first and second dielectric layers. These dielectric layers may be composed of silicon oxide, silicon nitride, or any other conforming dielectric material whose rates of formation and etching can be precisely controlled.

Furthermore, significant advances have recently been reported in creating materials having particularly low dielectric constants. Promising "low-k" dielectric materials include, but are not limited to, fluorosilicate glass (FSG), nanoporous silica, and organic polymers.

The thicknesses of the various layers of the array could also be varied and the array would still remain within the scope of the present invention. Thus, by employing low-k dielectric materials to provide inter-pixel isolation, thickness of the dielectric spacers may be decreased. This is because equivalent electrical isolation may be accomplished utilizing the same volume of dielectric material. Pixel arrays having even greater cell densities, higher resolution, and reduced light leakage between pixels may thus be formed in accordance with the present invention.

Finally, while FIGS. 4HA–4HB depict chemical-mechanical polishing through the third dielectric layer into the second metal layer to form the array, a number of alternatives to this step also exist.

For example, one alternative chemical-mechanical polishing approach would be to dispense entirely with the third dielectric layer, with the expectation that chemical-mechanical polishing of the second and first metal layers would not overly degrade their reflectance.

Given the multitude of embodiments described above, it is therefore intended that the following claims define the scope of the present invention, and that the methods and structures within the scope of these claims and their equivalents be covered hereby.

What is claimed is:

1. A method of forming an array of pixel cells in a light valve, the method comprising:

forming a first metal layer on top of an upper intermetal dielectric layer that is formed over an upper interconnect metallization layer, the upper intermetal dielectric layer having conductive vias extending therethrough from an upper surface of the upper intermetal dielectric layer to an upper surface of the upper interconnect metallization layer;

forming a first dielectric layer over the first metal layer;

forming a photoresist mask over the first metal layer in a checkerboard pattern which includes a plurality of masked squares but which excludes corners of the masked squares;

etching unmasked portions of the first dielectric layer and the first metal layer to stop on the upper intermetal dielectric layer, leaving raised portions of the first metal layer, each such raised portion of the first metal having a top and sidewalls;

removing the photoresist mask;

forming a second dielectric layer over the upper intermetal dielectric layer and over the top and sidewalls of the raised portions of the first metal layer, the second dielectric layer conforming to the sidewalls of the raised portions of the first metal layer;

etching the second dielectric layer to remove second dielectric layer from the upper intermetal dielectric layer and from the top of the raised portions of the first metal layer while leaving vertical dielectric sidewall spacers along the sidewalls of the raised portions of the first metal layer;

forming a second metal layer over the upper intermetal dielectric layer, the first dielectric layer, and the dielectric sidewall spacers; and chemical-mechanical polishing (CMP) through the second metal layer, the first dielectric layer, and the second dielectric layer to form a plurality of planar metal pixel electrodes electrically isolated from one another by intervening dielectric spacer structures;

providing liquid crystal material over the metal pixel electrodes; and sealing the liquid crystal material utilizing a translucent top plate.

2. The method of claim 1, and further comprising:

forming a third dielectric layer over the second metal layer; and wherein the CMP step includes chemical-mechanical polishing the third dielectric layer and the second metal layer to stop on a lower portion of the third dielectric layer; and removing remaining portions of the first and third dielectric layers.

3. The method of claim 1, and wherein the step of forming the photoresist mask comprises:

forming a photoresist layer in the checkerboard pattern which excludes corners of the masked squares; and developing the photoresist layer.

4. The method of claim 1, and wherein the step of forming the photoresist mask comprises:

forming a photoresist layer in the checkerboard pattern; and developing the photoresist layer such that corners of the masked squares are excluded.

5. The method of claim 1, and wherein the step of forming the photoresist mask comprises:

forming a photoresist mask in the checkerboard pattern which includes tabs connecting corners of diagonally-situated masked squares; and developing the photoresist layer such that corners of the masked squares are excluded.

6. The method of claim 1, and wherein:

the steps of forming the first and the second dielectric layers comprises forming a layer of silicon oxide; and the step of forming the third dielectric layer comprises forming a layer of silicon nitride.

7. The method of claim 1, and wherein:

the steps of forming the first and the second dielectric layers comprises forming a layer of silicon nitride; and the step of forming the third dielectric layer comprises forming a layer of silicon oxide.

8. The method of claim 1, and wherein:

the steps of forming the first, second, and third dielectric layers comprises forming a layer of silicon oxide.

9. The method of claim 1, and wherein:

the steps of forming at least one of the first, second, and third dielectric layers comprises forming a layer of a low-k dielectric material selected from the group consisting of fluorosilicate glass (FSG), nanoporous silica, and organic polymers.

* * * * *